United States Patent
Kobayashi

(10) Patent No.: US 8,908,239 B2
(45) Date of Patent: Dec. 9, 2014

(54) IMAGE READING DEVICE

(71) Applicant: Seiko Epson Corporation, Tokyo (JP)

(72) Inventor: Hidekazu Kobayashi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/852,252

(22) Filed: Mar. 28, 2013

(65) Prior Publication Data

US 2013/0265619 A1 Oct. 10, 2013

(30) Foreign Application Priority Data

Apr. 5, 2012 (JP) ................................. 2012-086225

(51) Int. Cl.
*H04N 1/04* (2006.01)
*H04N 1/028* (2006.01)
*H04N 1/031* (2006.01)

(52) U.S. Cl.
CPC ....... *H04N 1/02815* (2013.01); *H04N 1/02835* (2013.01); *H04N 1/0318* (2013.01); *H04N 2201/03125* (2013.01)
USPC ............ 358/475; 358/483; 358/497; 358/494

(58) Field of Classification Search
USPC .................. 358/475, 483, 497, 494, 482, 505
See application file for complete search history.

(56) References Cited

U.S. PATENT DOCUMENTS 6,469,808 B1 * 10/2002 Onishi et al. ................... 358/475
7,995,252 B2 * 8/2011 Okamoto et al. ............. 358/487

FOREIGN PATENT DOCUMENTS

JP 4145271 B2 6/2008

* cited by examiner

*Primary Examiner* — Houshang Safaipour

(57) ABSTRACT

Since a light emitting surface in a cross section perpendicular to the longitudinal direction of a light guide is formed to have a smaller width than a reflecting surface, light of an LED, which is incident from an end surface of the light guide and is scattered throughout the entirety of the longitudinal direction in the reflecting surface, is condensed toward the light emitting surface, and is then emitted in the form of a band toward a document from the light emitting surface. Therefore, it is possible to provide a CIS module including an illumination unit having a new configuration capable of illuminating a portion where the document and an optical axis of the lens array included in the lens unit intersect, in the form of a band with high efficiency using the illumination unit.

4 Claims, 14 Drawing Sheets

IMAGE READING DEVICE

CROSS REFERENCE TO RELATED APPLICATION

The entire disclosure of Japanese Patent Application No. 2012-086225, filed Apr. 5, 2012 is expressly incorporated by reference herein.

BACKGROUND

1. Technical Field

The present invention relates to an image reading device including an image forming optical device that forms an erect equal-magnification image by forming an image of reflected light from an object to be read.

2. Related Art

In the related art, a contact image sensor module (hereinafter, simply referred to as "CIS module") is used as an image reading device in image scanners, facsimiles, copy machines, financial terminal devices, and the like. The CIS module includes an illumination unit that illuminates an object to be read, an image forming optical device that forms an erect equal-magnification image of the object to be read, and a sensor that reads the erect equal-magnification image formed by the image forming optical device. In the CIS module, reflected light from the object illuminated by the illumination unit is condensed by the image forming optical device, and thus the erect equal-magnification image is formed on the sensor. For example, Japanese Patent No. 4145271 (paragraphs 0020 to 0022, FIG. 1, and the like) discloses an image reading device which includes an illumination unit disposed close to an image forming optical device along the longitudinal direction in which a rod-shaped light guide body formed of a transparent member such as an acryl resin is accommodated in a case. In addition, the light guide body includes a reflecting surface at the bottom in which a reflection structure is formed, right and left side surfaces that are formed as an elliptical curved surface, a parabolic curved surface, or a composite curved surface thereof, and a flat light emitting surface that is disposed so as to face the reflecting surface in a cross-sectional shape perpendicular to the longitudinal direction. Therefore, light of a light source, which is incident from an end surface of the light guide body and is scattered on the reflecting surface, is reflected by the right and left side surfaces of the light guide body, and is then emitted toward an object to be read from the light emitting surface.

Incidentally, in order to form a clear erect equal-magnification image on a sensor using the image forming optical device, a portion where the object to be read and an optical axis of a lens array included in the image forming optical device intersect needs to be sufficiently illuminated in the form of a band using an illumination unit. Therefore, a technique to illuminate the object to be read with high efficiency is required.

SUMMARY

An advantage of some aspects of the invention is that it provides an image reading device including an illumination unit having a new configuration capable of illuminating an object to be read with high efficiency.

According to an aspect of the invention, there is provided an image reading device including an illumination unit that has a rod-shaped light guide body guiding light of a light source to an object to be read and illuminates the object, and an image forming optical device that is disposed parallel to the light guide body, has a lens array provided with an incidence surface in which a plurality of lens surfaces are arranged in the same direction as the longitudinal direction of the light guide body, and condenses reflected light from the object which is incident on the incidence surface, thereby forming an erect equal-magnification image on a sensor. The light guide body is formed of a transparent member, and includes a reflecting surface in which a reflecting structure reflecting the light of the light source, which is incident into the light guide body from at least one end surface of the light guide body, is formed, and a light emitting surface from which the light reflected by the reflecting surface is emitted toward the object. The reflecting surface and the light emitting surface are formed along the longitudinal direction on an outer circumferential surface of the light guide body and are disposed so as to face each other with the transparent member interposed therebetween, and the light emitting surface in a cross section perpendicular to the longitudinal direction is formed to have a smaller width than the reflecting surface.

In the invention configured in this manner, the rod-shaped light guide body that guides the light of the light source to the object to be read is formed of a transparent member, and has the reflecting surface in which the reflection structure reflecting the light of the light source, which is incident into the light guide body from at least one end surface of the light guide body, is formed, and the light emitting surface from which the light reflected by the reflecting surface is emitted toward the object. The reflecting surface and the light emitting surface are formed along the longitudinal direction on the outer circumferential surface of the light guide body and are disposed so as to face each other with the transparent member interposed therebetween. In addition, since the light emitting surface in the cross section perpendicular to the longitudinal direction of the light guide body is formed to have a smaller width than the reflecting surface, the light of the light source, which is incident from the end surface of the light guide body and is scattered throughout the entirety of the longitudinal direction on the reflecting surface, is totally reflected by the outer circumferential surface of the light guide body inside the transparent member, is condensed toward the light emitting surface, and is emitted in the form of a band toward an object to be read from the light emitting surface. Therefore, since the light that is condensed toward the light emitting surface inside the light guide body is emitted in the form of a band toward the object to be read from the light emitting surface, it is possible to provide the image reading device including an illumination unit having a new configuration capable of illuminating a portion where the object to be read and an optical axis of the lens array included in the image forming optical device intersect, in the form of a band with high efficiency using the illumination unit.

In addition, the cross section perpendicular to the longitudinal direction of the light guide body may have a shape that tapers toward the light emitting surface side from the reflecting surface side.

With such a configuration, since the cross section perpendicular to the longitudinal direction of the light guide body has a shape that tapers toward the light emitting surface side from the reflecting surface side, it is possible to condense the light of the light source, which is scattered throughout the entirety of the longitudinal direction on the reflecting surface, toward the light emitting surface with higher efficiency by totally reflecting the light by the outer circumferential surface of the light guide body, and it is possible to illuminate the object to be read with higher efficiency with the light emitted in the form of a band toward the object to be read from the light emitting surface. In addition, since the cross section perpendicular to the longitudinal direction of the light guide body has a shape that tapers toward the light emitting surface side from the reflecting surface side, it is possible to dispose the center of the light emitting surface in the cross section perpendicular to the longitudinal direction so as to be closer to the optical axis of the lens array in the cross section perpendicular to the arrangement direction of each lens surface.

In the light guide body, a portion of the outer circumferential surface thereof which faces the incidence surface is chamfered along the light emitting surface in the longitudinal direction, and the light emitting surface of the light guide body and the incidence surface of the image forming optical device may be disposed close to each other.

With such a configuration, in the light guide body, the portion of the outer circumferential surface thereof which faces the incidence surface is chamfered along the light emitting surface in the longitudinal direction, and thus the center of the light emitting surface in the cross section perpendicular to the longitudinal direction is disposed so as to be closer to the optical axis of the lens array in the cross section perpendicular to the arrangement direction of each lens surface, thereby allowing the position closer to the incidence surface on the optical axis to be illuminated in the form of a band using the illumination unit. In addition, the light emitting surface of the light guide body is disposed close to the incidence surface of the image forming optical device, thereby allowing the image reading device to be made small.

Further, the image forming optical device further may include a case body that accommodates the lens array, and a portion of the case body which faces the light guide body may be chamfered along an arrangement direction of the lens surface.

With such a configuration, since the portion of the case body, accommodating the lens array, which faces the light guide body is chamfered along the arrangement direction of the lens surface, the center of the light emitting surface in the cross section perpendicular to the longitudinal direction of the light guide body may be disposed closer to the optical axis of the lens array in the cross section perpendicular to the arrangement direction of each lens surface.

In addition, the illumination unit further may include a light shielding film that covers an outer circumferential surface of the light guide body except for the light emitting surface, and a scattering surface that scatters light may be formed on a surface of the light shielding film which comes into contact with the transparent member.

With such a configuration, the light reflected by the reflecting surface in the transparent member that forms the light guide body may be condensed toward the light emitting surface with higher efficiency by totally reflecting the light by the scattering surface of the light shielding film. In addition, the light of the light source which is incident on the light guide body may be prevented from leaking to the outside from the outer circumferential surface of the light guide body using the light shielding film.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
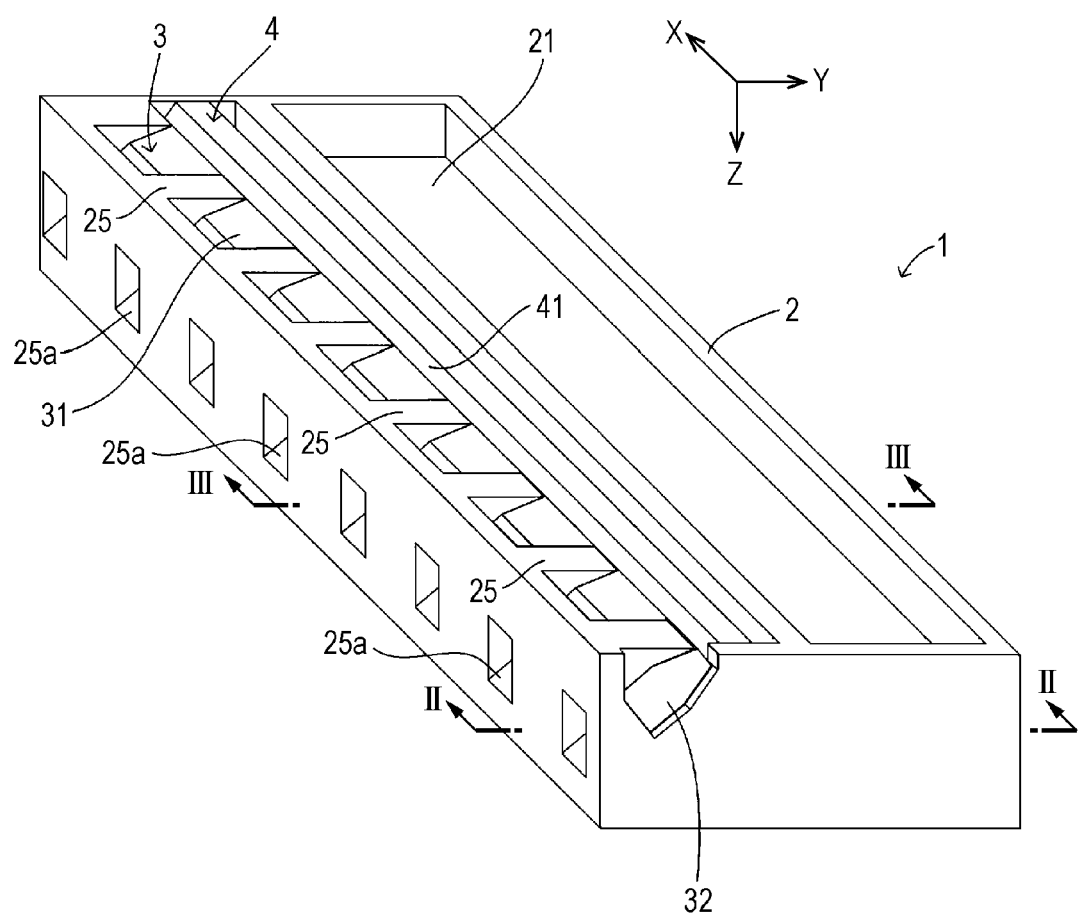
FIG. 1 is a perspective view illustrating a CIS module which is an embodiment of an image reading device.
Figure 2:
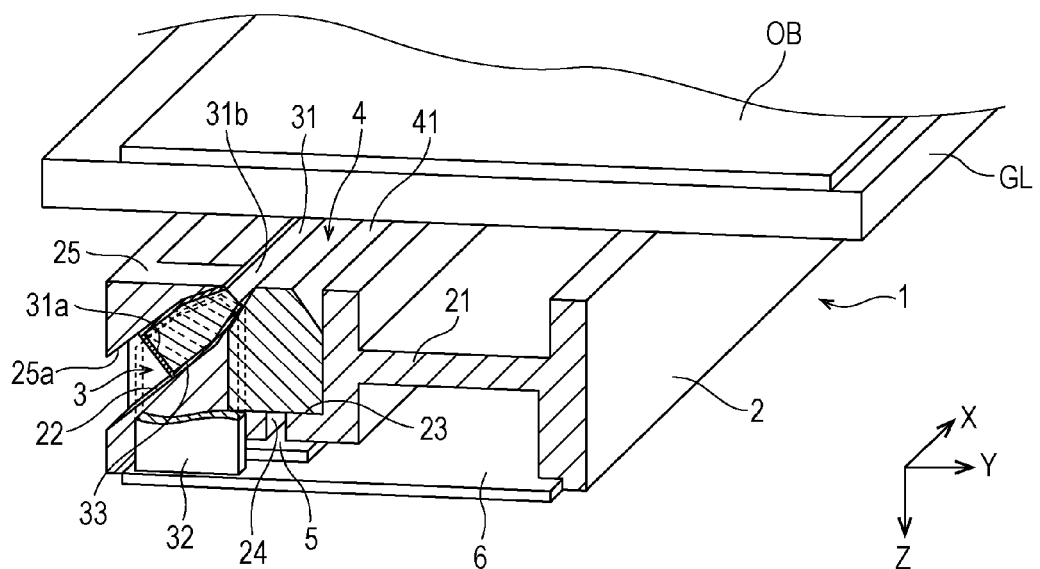
FIG. 2 is a partial cross-sectional perspective view taken along line II-II of FIG. 1.
Figure 3:
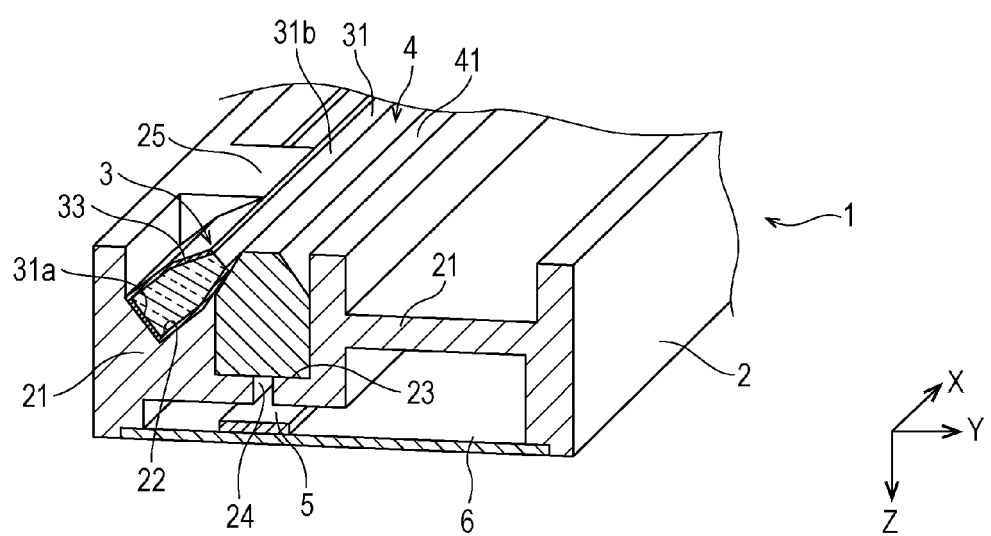
FIG. 3 is a cross-sectional perspective view taken along line III-III of FIG. 1.
Figure 4:
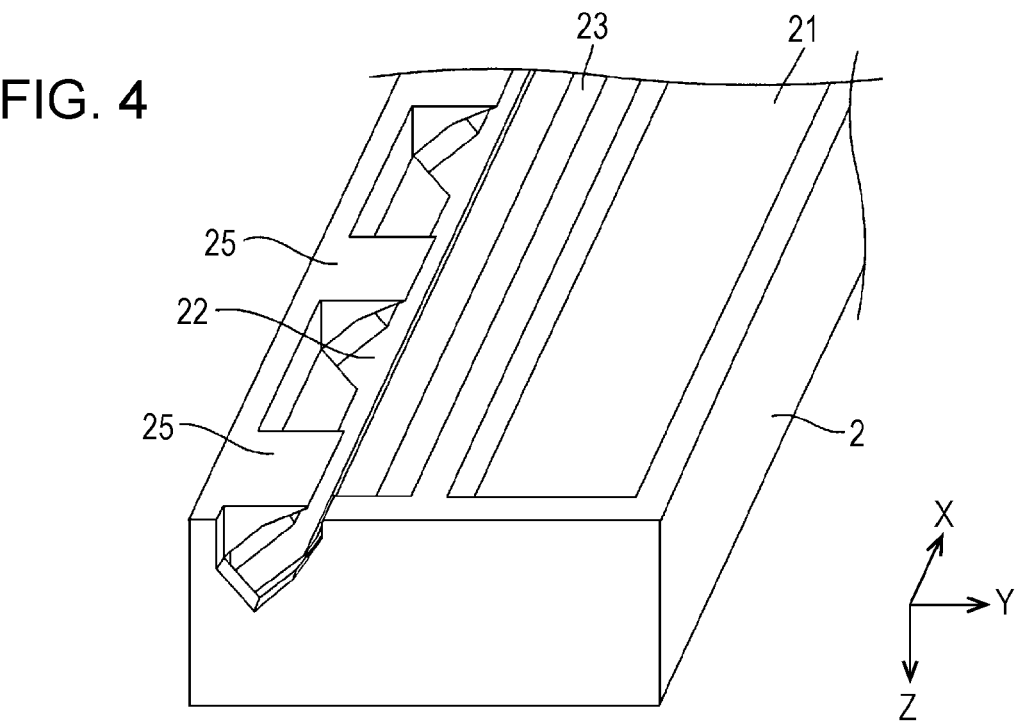
FIG. 4 is a perspective view illustrating a frame included in the CIS module.
Figure 5:
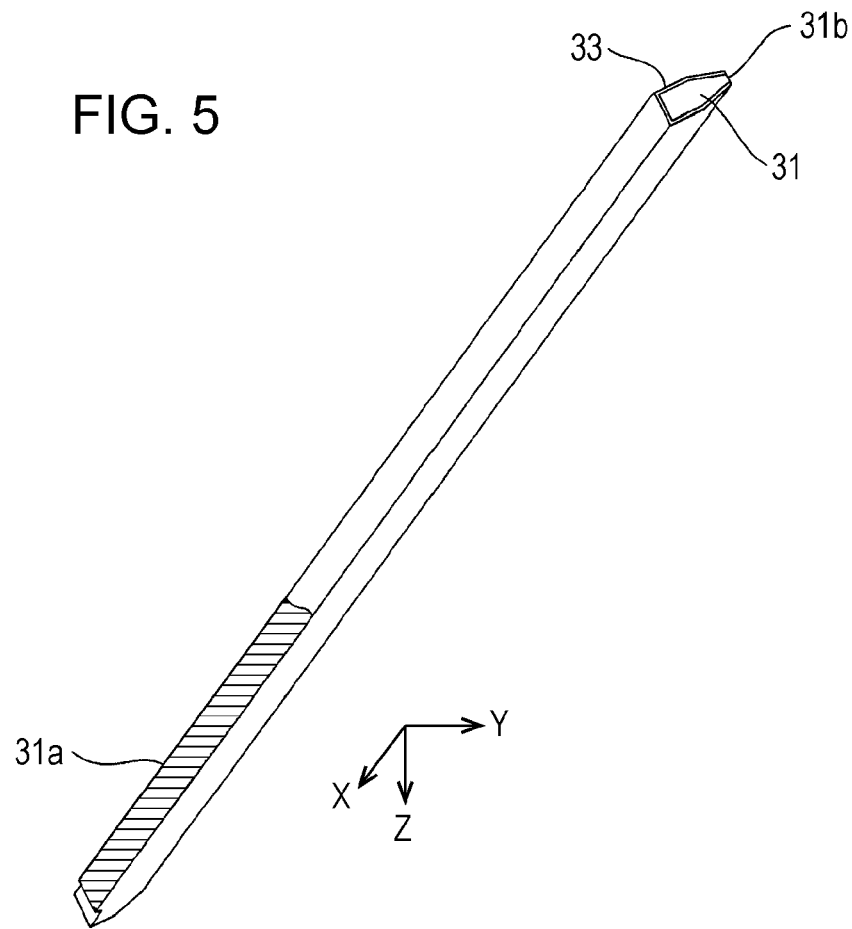
FIG. 5 is a perspective view illustrating a light guide included in the CIS module.
Figure 6:
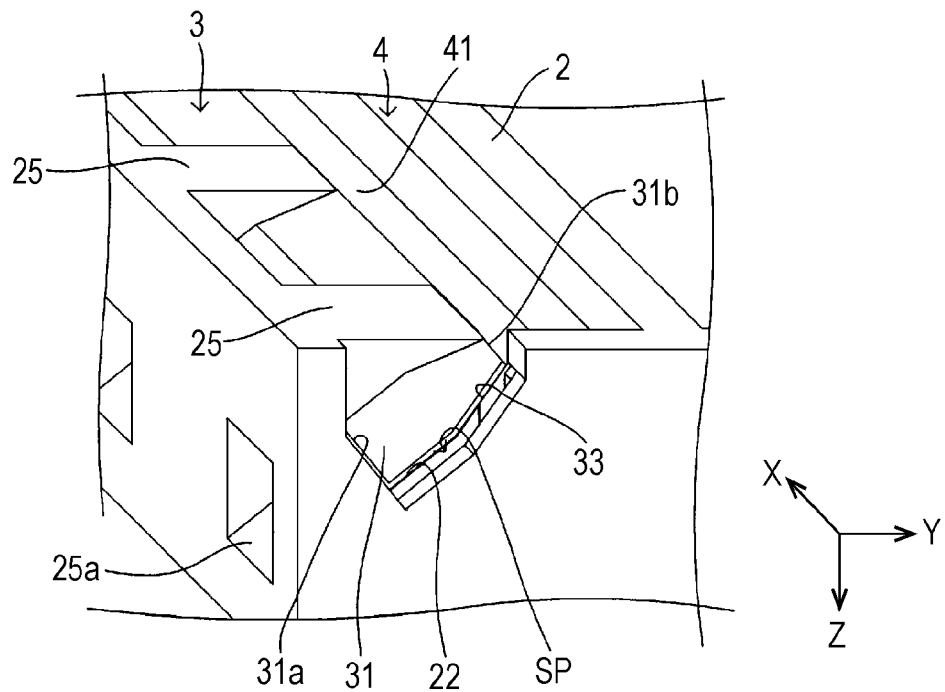
FIG. 6 is an enlarged view illustrating main parts of the CIS module.
Figure 7:
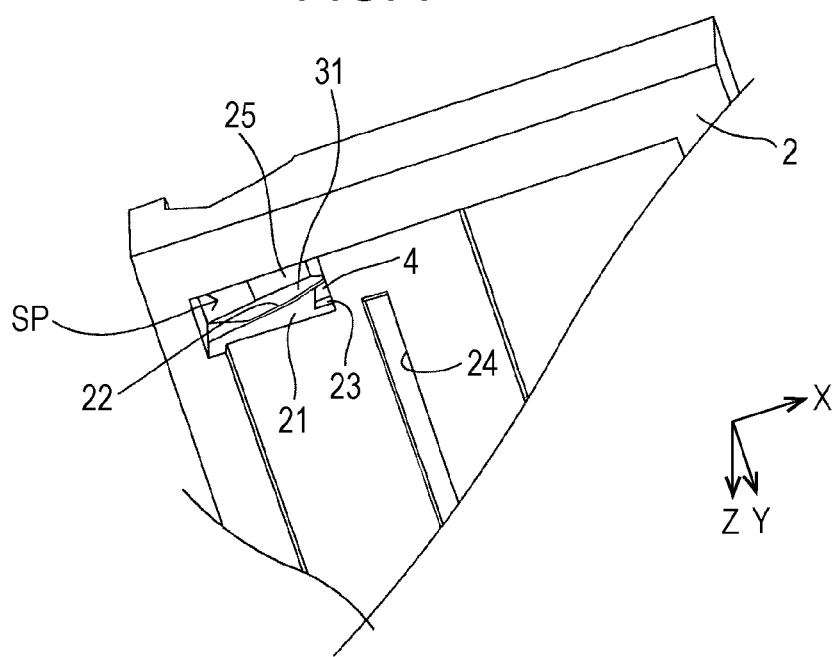
FIG. 7 is a rear view of the CIS module.

Hereinafter, a CIS module which is an embodiment of an image reading device of the invention will be described with reference to FIGS. 1 to 7. FIG. 1 is a perspective view illustrating the CIS module which is an embodiment of the image reading device. FIG. 2 is a partial cross-sectional perspective view taken along line II-II of FIG. 1. FIG. 3 is a cross-sectional perspective view taken along line III-III of FIG. 1. FIG. 4 is a perspective view illustrating a frame included in the CIS module. FIG. 5 is a perspective view illustrating a light guide included in the CIS module. FIG. 6 is an enlarged view illustrating main portions of the CIS module. FIG. 7 is a rear view of the CIS module.

A CIS module 1 (corresponding to "image reading device" of the invention) is a device that reads an image printed onto a document OB using the document OB placed on a document glass GL as an object to be read, and is disposed directly below the document glass GL. The CIS module 1 has a cuboidal frame 2 that extends longer than a read range of the document OB in an X direction. An illumination unit 3, a lens unit 4 (corresponding to "image forming optical device" of the invention), a sensor 5, and a printed circuit substrate 6 are disposed in the frame 2.

An internal space of the frame 2 is partitioned by an intermediate member 21 provided in the frame 2 into an upper space for disposing the illumination unit 3 and the lens unit 4 and a lower space for disposing the printed circuit substrate 6 provided with the sensor 5 and an LED substrate 32 of the illumination unit 3. In addition, on the upper space side of the intermediate member 21, an inclined groove 22 for disposing a light guide 31 included in the illumination unit 3 and a concave groove 23 for disposing the lens unit 4 extend in the X direction. A slit 24 for transmitting light, emitted from the lens unit 4, which has a predetermined read width in the X direction extends in the X direction at the bottom of the concave groove 23, and an upper space and a lower space of the frame 2 communicate with each other via the slit 24.

A plurality of pressing members 25 for pressing the light guide 31 disposed in the inclined groove 22 from above are provided in the frame 2 at predetermined intervals in the X direction above the inclined groove 22. The pressing members 25 protrude inward from a lateral wall of the frame 2 which is adjacent along the inclined groove 22 so as to be integrally formed with the frame 2. In addition, a pressing surface that presses the light guide 31 disposed on the lower surface sides of the pressing members 25 is formed in substantially the same shape as an upper outer circumferential surface of the light guide 31 which is an object to be read.

In addition, in a state where the light guide 31 is pressed from above by the pressing members 25, a portion chamfered along the longitudinal direction (X direction) on the lower side of the light emitting surface 31b of the light guide 31 comes into contact with a portion chamfered along the longitudinal direction (X direction) of an upper left side of the case body 41 of the lens unit 4 fitted into the concave groove 23. The lens unit 4 is fixed to the concave groove 23 by being pressed inward the concave groove 23 by the light guide 31 that is pressed by the pressing members 25. Meanwhile, a rectangular hole 25a communicating with the inclined groove 22 along the lower side of the pressing member is formed at a position of the lateral wall of the frame 2 which corresponds to each of the respective pressing members 25. As will be described later with reference to FIGS. 16 to 18, the holes 25a are formed by obliquely disposing the inclined groove 22 and pressing member forming dies 203 for forming the pressing members 25 in the upper space of the frame 2.

The illumination unit 3 illuminates the document OB by using an LED (Light Emitting Diode: not shown) that is provided in the LED substrate 32 attached to the printed circuit substrate 6 as a light source and by having the light guide 31 (corresponding to "light guide body" of the invention) that guides light of the LED to the document OB placed on the document glass GL. Meanwhile, the LED substrate 32 is partially illustrated in FIG. 2 by illustrating an upper end portion thereof as a dotted line.

The light guide 31 is formed of a transparent member such as an acryl resin or glass, and has substantially the same length as the read range of the CIS module 1, and thus the light guide 31 is disposed in the X direction in the inclined groove 22 provided in an upper surface of the intermediate member 21. In addition, the light guide 31 has a reflecting surface 31a in which a reflection structure reflecting the light of the LED, which is incident into the light guide 31 from one end surface (front side toward the paper plane of FIG. 2), is formed, and a light emitting surface 31b from which the light reflected by the reflecting surface 31a is emitted toward the document OB. The reflecting surface 31a and the light emitting surface 31b are formed in the outer circumferential surface of the light guide 31 along the longitudinal direction and are disposed so as to face each other with the transparent member interposed therebetween. The light emitting surface 31b in the cross section perpendicular to the longitudinal direction of the light guide 31 is formed to have a smaller width than the reflecting surface 31a.

In addition, the cross section perpendicular to the longitudinal direction of the light guide 31 has a hexagonal shape that tapers toward the light emitting surface 31b side from the reflecting surface 31a side. A portion of the light guide 31 which faces the lens unit 4 is chamfered along the light emitting surface 31b in the longitudinal direction. The chamfered portion of the light guide 31 contacts a portion of the lens unit 4 which is similarly chamfered along the X direction, and thus the light emitting surface 31b is disposed close to the lens unit 4. As illustrated in FIG. 5, the illumination unit 3 further includes a light shielding film 33 covering the outer circumferential surface of the light guide 31 except for the light emitting surface 31b, and a scattering surface that scatters light is formed on a surface of the light shielding film 33 which comes into contact with the light guide 31 (transparent member) of the light shielding film 33. Meanwhile, in the embodiment, the light shielding film 33 is formed to have a thickness of approximately 125 μm. In addition, the light shielding film 33 covering the reflecting surface 31a is partially illustrated in FIG. 5.

In addition, as illustrated in FIGS. 6 and 7, the light emitting surface 31b is inserted into the inclined groove 22 formed in the upper surface of the intermediate member 21 of the frame 2 in the X direction toward the lens unit 4 side from the front side of the light guide 31 toward the paper plane, and thus an insertion space SP for inserting the LED substrate 32 is formed at a position of the end surface on the front side of the light guide 31. As illustrated in FIGS. 1 and 2, the printed circuit substrate 6 provided with the LED substrate 32 is disposed at a predetermined position in the lower space of the frame 2, and thus the LED substrate 32 is inserted into the insertion space SP from the lower side thereof. Accordingly, an end surface of a tip side of the LED substrate 32 is positioned by coming into contact with the pressing surfaces of the pressing members 25, and thus the LED provided in the LED substrate 32 is disposed so as to face the end surface on the front side which is one end side of the light guide 31 in the longitudinal direction.

If illumination light from the LED is incident on one end of the light guide 31, the illumination light is propagated through the light guide 31 toward the other end of the light guide 31 and is scattered by the reflecting surface 31a. The illumination light scattered by the reflecting surface 31a is totally reflected by the outer circumferential surface (light shielding film 33) inside the light guide 31, and is thus condensed toward the light emitting surface 31b. The condensed illumination light is emitted toward the document glass GL from the light emitting surface 31b, and is thus irradiated in a state where the illumination light is condensed in the document OB on the document glass GL. In this manner, the document OB is irradiated with band-like illumination light extending in the X direction, and the illumination light is reflected by the document OB.

Meanwhile, an elastic member (not shown) such as a sponge, rubber, or a spring is provided on an inner wall surface of the frame 2 which comes into contact with an end surface on the opposite side to the one end of the light guide 31 on which illumination is incident from the LED. The light guide 31 is biased using the elastic member in a direction in which the elastic member escapes from the inclined groove 22, and thus the light guide 31 comes into contact with the LED provided in the LED substrate 32. The LED substrate 32 that is inserted into the insertion space SP from below is positioned by coming into contact with the inner wall surface of the frame 2 which faces an inner wall surface provided with the elastic member in a direction in which the LED substrate 32 is pressed by the light guide 31 biased by the elastic member. Therefore, the light guide 31 is fixed to the inclined groove 22 by being exactly positioned between the elastic member and the LED substrate 32.

In addition, since the upper space of the frame 2 in which the illumination unit 3 is disposed and the lower space in which the sensor 5 (printed circuit substrate 6) is disposed are spaced apart from each other by the intermediate member 21, there is no concern that the light of the illumination unit 3 leaks to the lower space, thereby preventing the generation of noise due to the incidence of the light on the sensor 5 which has leaked from the illumination unit 3.

The above-described concave groove 23 is provided in the X direction at a position directly below a position at the illumination light is irradiated using the illumination unit 3, and the lens unit 4 is disposed in parallel with the light guide 31 by being fitted into the concave groove 23. The lens unit 4 includes a lens array (not shown) provided with an incidence surface on which each lens surface is arranged in the same X direction as the longitudinal direction of the light guide 31 in a state where mutual optical axes of a plurality of lenses are parallel to each other, and the case body 41 that accommodates the lens array. In addition, the lens unit 4 forms an erect equal-magnification image of the document OB on the sensor 5 by condensing the reflected light from the document OB which is incident on the incidence surface.

The lens array extends in the X direction by substantially the same length as the read range of the CSI module 1, and is integrally molded by a transparent medium such as a resin or glass having optical transparency with respect to the illumination light. In addition, a plurality of through holes (not shown) that are pierced so as to correspond to the respective lenses are formed along the X direction in the case body 41 on the incidence side of the lens array, and an incident direction of the reflected light emitted from the document OB is regulated by the through holes. In addition, a plurality of through holes (not shown) that are pierced so as to correspond to the respective lenses are formed along the X direction in the case body 41 on the emission side of the lens array, and an emission direction of the light emitted from the lens array is regulated by the through holes.

In other words, on the incidence side and the emission side of the lens array, the case body 41 in which the plurality of through holes are formed along the X direction serves as an aperture member for the lens array, and thus the incidence of stray light on the sensor 5 is prevented. Meanwhile, the slit 24 that is formed in the X direction at the bottom of the concave groove 23 provided in the intermediate member 21 of the frame 2 is formed at a position at which optical axes on the emission side of the lenses constituting the lens array are arranged in the X direction, and the slit 24 is formed so as to be wider to a certain extent than the optical axis of each lens on the emission side in the X direction. The reflected light incident on the lens unit 4 passes through the slit 24 and is condensed on the sensor 5.

A portion of the case body 41 which faces the light guide 31 is chamfered along the X direction, and as described above, the chamfered portion of the light guide 31 comes into contact with the chamfered portion of the case body 41 and presses the case body 41 inward the concave groove 23, and thus the lens unit 4 (case body 41) is fixed inside the concave groove 23 of the frame 2.

As illustrated in FIG. 1, the sensor 5 is attached in the X direction to the printed circuit substrate 6 on which the LED substrate 32 is mounted, and thus the sensor 5 reads the erect equal-magnification image of the document OB and outputs a signal associated with the erect equal-magnification image.

The CIS module 1 configured as described above is assembled as follows. In other words, as illustrated in FIGS. 6 and 7, first, the lens unit 4 is fitted into the concave groove 23 provided on the upper space side of the frame 2, and thus the light guide 31 is inserted into the inclined groove 22. As illustrated in FIGS. 1 and 2, the printed circuit substrate 6 is disposed at a predetermined position of the lower space of the frame 2 so that the LED substrate 32 is inserted into the insertion space SP from the lower side thereof, and thus the assembling of the CIS module 1 is completed.

Figure 8A:
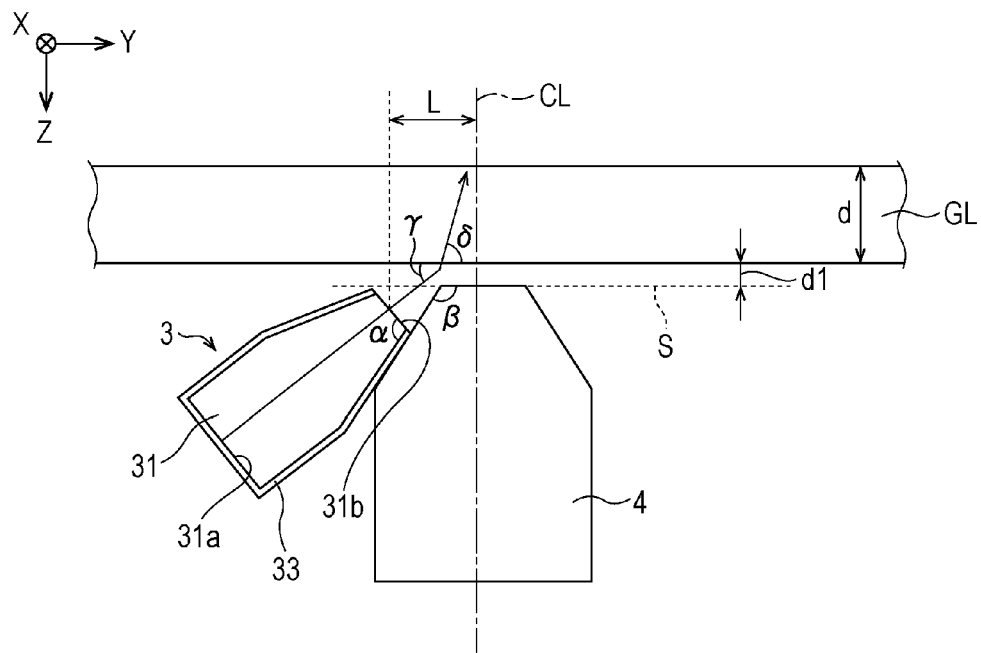
FIGS. 8A and 8B are diagrams illustrating an illumination state of a document using a light guide.
Figure 8B:
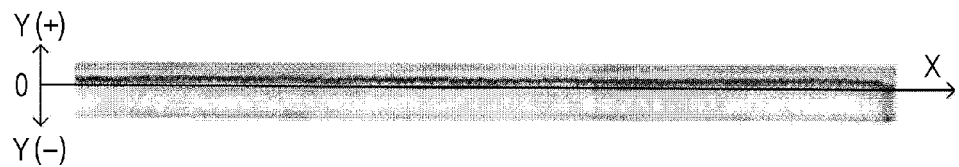

Next, an example of an arrangement relationship between the light guide 31 and the lens unit 4 will be described with reference to FIGS. 8A and 8B. FIGS. 8A and 8B are diagrams illustrating an illumination state of a document using a light guide. FIG. 8A illustrates the arrangement relationship between the light guide and the lens unit, and FIG. 8B illustrates the illumination state of the document. In addition, in FIG. 8B, the position of an original point O in a Y direction corresponds to the position of an optical axis CL of the lens unit 4 in the cross section perpendicular to the X direction, a Y(+) direction indicates the lens unit side, a Y(−) direction indicates the light guide side, and the original point O side indicates the end surface side of the light guide 31 on which the illumination light is incident by the LED. In addition, FIG. 8B illustrates brightness in the X direction at the position of the optical axis CL which is derived from a simulation using illumination analysis software "LightTools" made by Cybernet Systems Co., Ltd.

In the embodiment, a width of the reflecting surface 31$a$, a width of the light emitting surface 31$b$, and a distance between the reflecting surface 31$a$ and the light emitting surface 31$b$ in the cross section perpendicular to the longitudinal direction of the light guide 31 are set to 2 mm, 0.8 mm, and 4 mm, respectively. In addition, since the document glass GL is formed of a material having a refractive index of 1.51, when an angle formed by a normal line of the light emitting surface 31$b$ of the light guide 31 and the document glass GL is γ, an angle δ formed by a traveling direction of light that is incident on the document glass GL and is then refracted and the document glass GL is $\sin \delta = (\sin \gamma)/1.51$.

Therefore, when a distance between a top surface of the lens unit 4 and a lower surface of the document glass GL is d1 and the thickness of the document glass GL is d, in order for light emitted from the light guide 31 to be irradiated onto an intersection between an upper surface of the document glass GL and the optical axis CL of the lens unit 4, a distance L between the center of the light emitting surface 31$b$ in the cross section perpendicular to the longitudinal direction of the light guide 31 and the optical axis CL of the lens unit 4 can be represented as $L = d1/\tan(\gamma) + d/\tan(\delta)$. In the embodiment, since the distance d1 between the top surface of the lens unit 4 and the lower surface of the document glass GL is set to 0.66 mm and the thickness d of the document glass GL is set to 2.8 mm, for example, when the angle γ formed by the normal line of the light emitting surface 31$b$ of the light guide 31 and the document glass GL is 40 degrees, the distance L between the center of the light emitting surface 31$b$ and the optical axis CL of the lens unit 4 is approximately 2.4 mm. Therefore, in the above-described conditions, when the light guide 31 and the lens unit 4 are disposed such that the distance between the center of the light emitting surface 31$b$ and the optical axis CL is 2.4 mm, the position of the optical axis CL of the document OB is appropriately illuminated in the form of a band in the X direction by the illumination light emitted from the light emitting surface 31$b$.

In addition, as illustrated in FIG. 8A, the lateral wall of the frame 2, an upper surface of the pressing member 25, and a top surface in which the through holes of the case body 41 of the lens unit 4 are formed are disposed on substantially the same plane S, and thus the light guide 31 is disposed so as not to protrude from the document glass GL beyond the plane S.

Meanwhile, in the embodiment, chamfering is performed on the light guide 31 so that an angle α with the light emitting surface 31b is 100 to 140 degrees, and chamfering is performed on the lens unit 4 so that an angle β with the top surface is 100 to 140 degrees. Therefore, the incidence surface of the light guide 31 and the incidence surface of the lens unit 4 are disposed close to each other so that the distance L is equal to or less than 2.4 mm. In addition, the light guide 31 and the lens unit 4 are disposed such that a relationship between a chambering angle α of the above-described light guide 31, a chambering angle β of the lens unit 4, and an incident angle γ of a beam satisfies the expression, α+β+γ=270, and thus the light emitted from the light emitting surface 31b of the light guide 31 is irradiated in the form of a band onto a portion where the upper surface of the document glass GL and the optical axis CL of the lens unit 4 intersect.

In other words, as illustrated in FIG. 8B, in a state where an irradiation center minutely leans to the light guide 31 side, the light emitted from the light emitting surface 31b of the light guide 31 is appropriately irradiated in the form of a band with light utilization efficiency of 19.2% with respect to the portion where the upper surface of the document glass GL and the optical axis CL of the lens unit 4 intersect.

Comparative Example

Figure 9A:
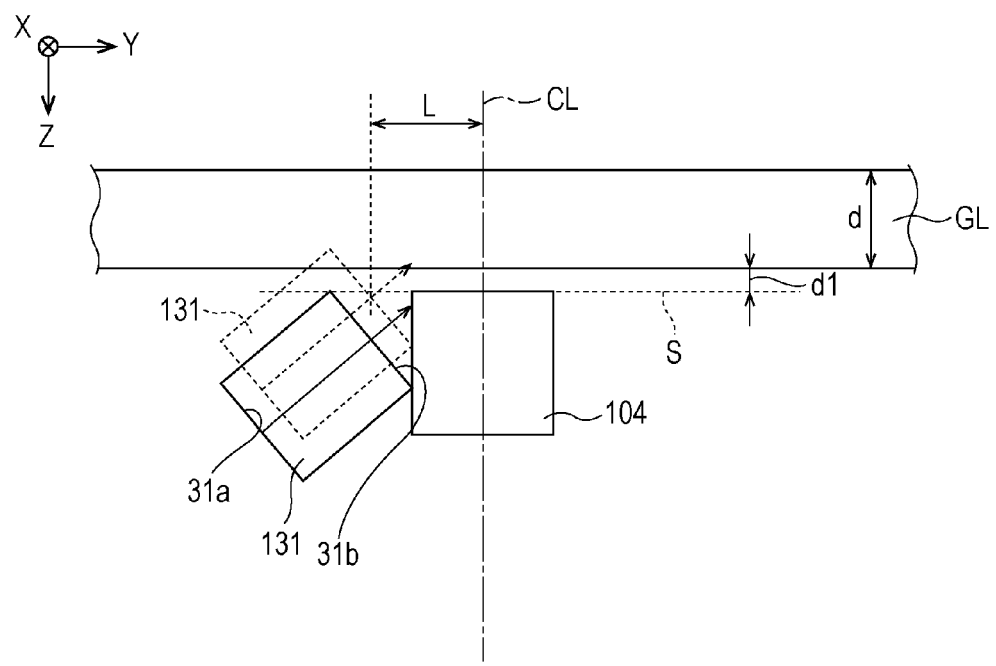
FIGS. 9A and 9B are diagrams illustrating an illumination state of a document according to a Comparative Example.
Figure 9B:
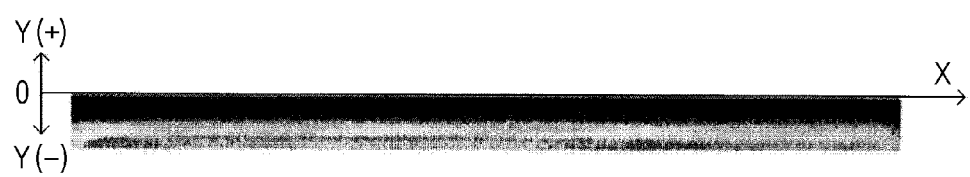

Hereinafter, a Comparative Example will be described with reference to FIGS. 9A and 9B. FIGS. 9A and 9B are diagrams illustrating an illumination state of a document according to the Comparative Example. FIG. 9A illustrates an arrangement relationship between a light guide and a lens unit, and FIG. 9B illustrates the illumination state of the document. As illustrated in FIG. 9A, in the Comparative Example, the above-described chamfering is not performed on outer peripheries of a light guide 131 and a lens unit 104, and the cross section of each of the light guide 131 and the lens unit 104 which is perpendicular to the longitudinal direction (X direction) is formed to have a rectangular shape. In addition, the light emitting surface 31b of the light guide 131 in the cross section perpendicular to the longitudinal direction is formed to have the same width as the reflecting surface 31a. Other components are the same as the above-described example, and thus a description thereof will not be repeated by providing the same reference numerals.

In the Comparative Example, since chamfering is not performed on the light guide 131 and the lens unit 104, the light guide 131 and the lens unit 104 cannot be disposed close to each other. Further, illumination light of an LED which is incident on the light guide 131 is not condensed toward the light emitting surface 31b. Therefore, as illustrated in FIG. 9B, the illumination center leans to the light guide 131 side to a large extent, and thus the portion where the upper surface of the document glass GL and the optical axis CL of the lens unit 4 intersect is hardly illuminated with light emitted from the light emitting surface 31b of the light guide 131.

In addition, as illustrated as a dotted line in FIG. 9B, in order for the portion where the upper surface of the document glass GL and the optical axis CL of the lens unit 4 intersect to be illuminated with the light emitted from the light emitting surface 31b of the light guide 131, the light guide 131 has to be disposed on the upper side excessively beyond the plane S. However, since the document glass GL is disposed directly above the CIS module 1, it is not practically possible to dispose the light guide 131 at a position of the dotted line in FIG. 9B.

Modification Example 1

Figure 10A:
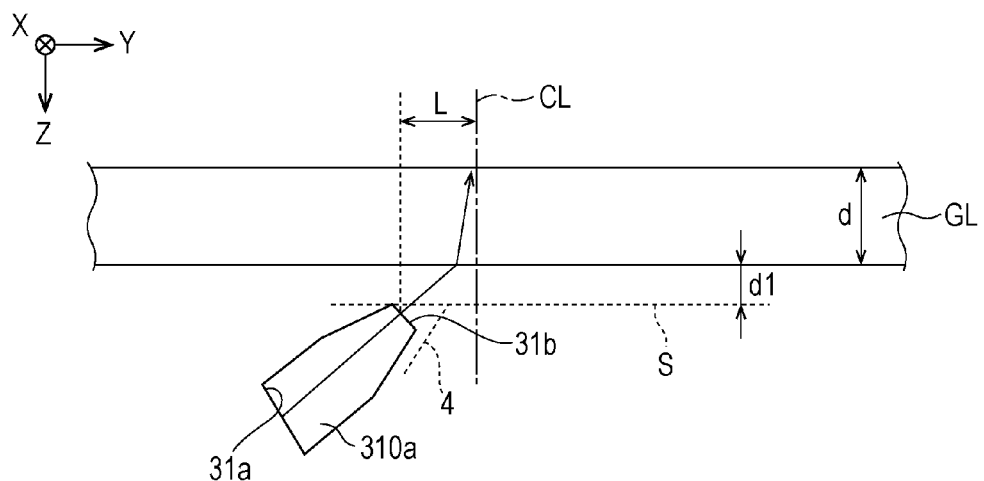
FIGS. 10A and 10B are diagrams illustrating Modification Example 1 of the light guide.
Figure 10B:
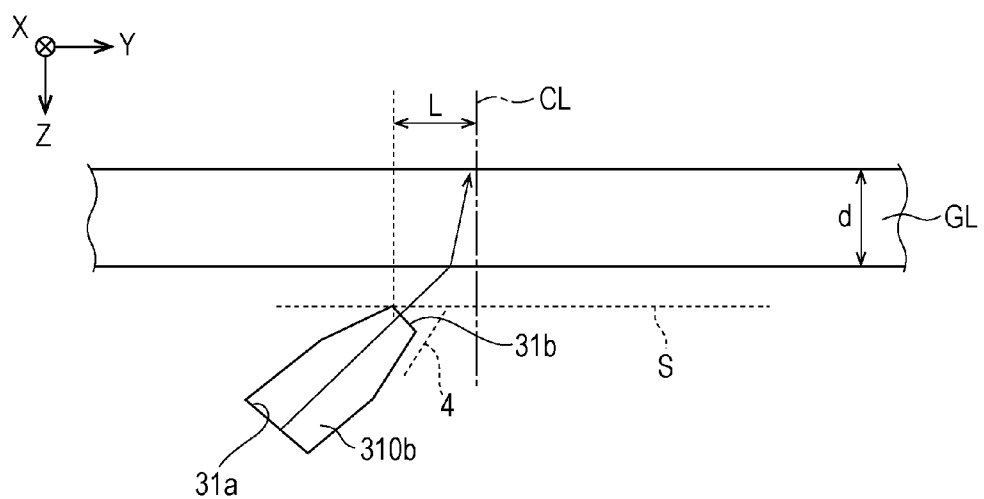

Hereinafter, Modification Example 1 of the light guide will be described with reference to FIGS. 10A and 10B. FIGS. 10A and 10B are diagrams illustrating Modification Example 1 of the light guide. FIGS. 10A and 10B illustrate different Modification Examples 1. The example illustrated in FIG. 10A is different from the example illustrated in FIG. 8A in that the reflecting surface 31a is inclined at approximately 10 degrees in a clockwise direction toward the paper plane in a cross section perpendicular to the longitudinal direction of a light guide 310a. The example illustrated in FIG. 10B is different from the example illustrated in FIG. 8A in that the reflecting surface 31a is inclined at approximately 10 degrees in a counterclockwise direction toward the paper plane in a cross section perpendicular to the longitudinal direction of a light guide 310b. Other components are the same as the above-described example, and thus a description thereof will not be repeated by providing the same reference numerals.

In Modification Example 1 illustrated in FIGS. 10A and 10B, light condensing efficiency deteriorates to a certain extent as compared with the example illustrated in FIG. 8A. However, the portion where the upper surface of the document glass GL and the optical axis CL of the lens unit 4 intersect is appropriately irradiated with the light emitted from the light emitting surface 31b of the light guide 31 in the form of a band.

Modification Example 2

Figure 11A:
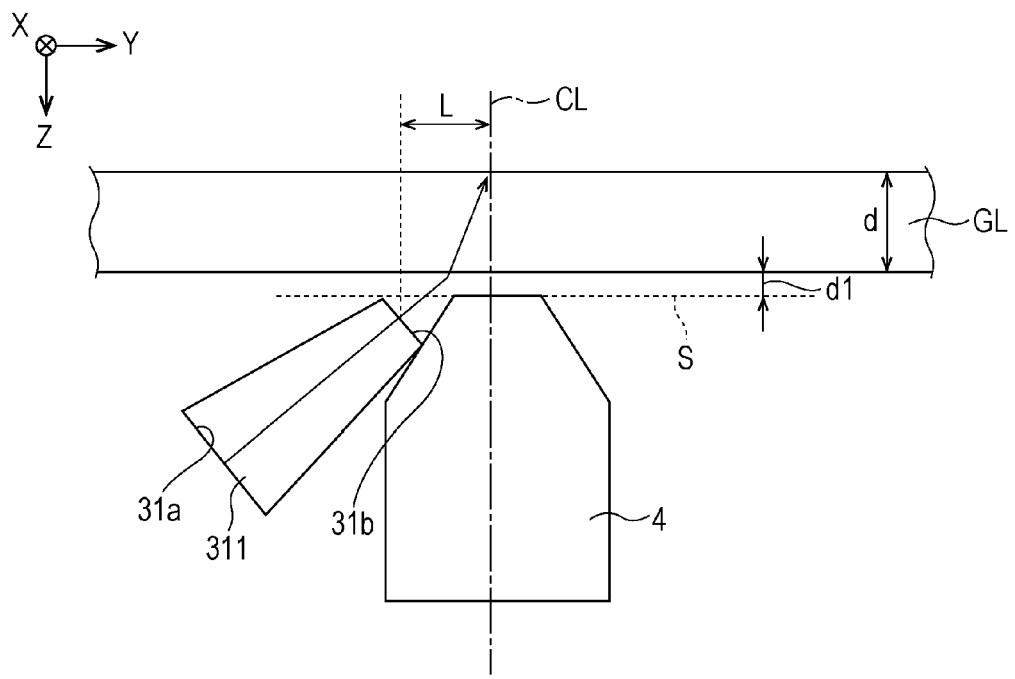
FIGS. 11A and 11B are diagrams illustrating an illumination state of a document according to Modification Example 2 of the light guide.
Figure 11B:
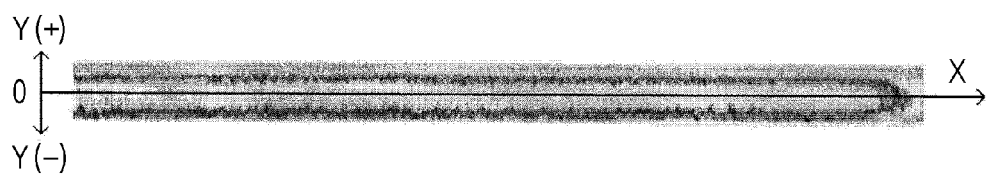

Hereinafter, Modification Example 2 of the light guide will be described with reference to FIGS. 11A and 11B. FIGS. 11A and 11B are diagrams illustrating an illumination state of a document in Modification Example 2 of the light guide. FIG. 11A illustrates an arrangement relationship between the light guide and a lens unit, and FIG. 11B illustrates the illumination state of the document. The example illustrated in FIG. 11A is different from the example illustrated in FIG. 8A in that a cross section perpendicular to the longitudinal direction of a light guide 311 is formed to have a trapezoidal shape that tapers toward the light emitting surface 31b side from the reflecting surface 31a side. Other components are the same as the above-described example, and thus a description thereof will not be repeated by providing the same reference numerals.

In Modification Example 2 illustrated in FIG. 11A, as illustrated in FIG. 11B, the portion where the upper surface of the document glass GL and the optical axis CL of the lens unit 4 intersect is appropriately irradiated with light use efficiency of 19.3% with the light emitted from the light emitting surface 31b of the light guide 31 in the form of a band.

Modification Example 3

Figure 12A:
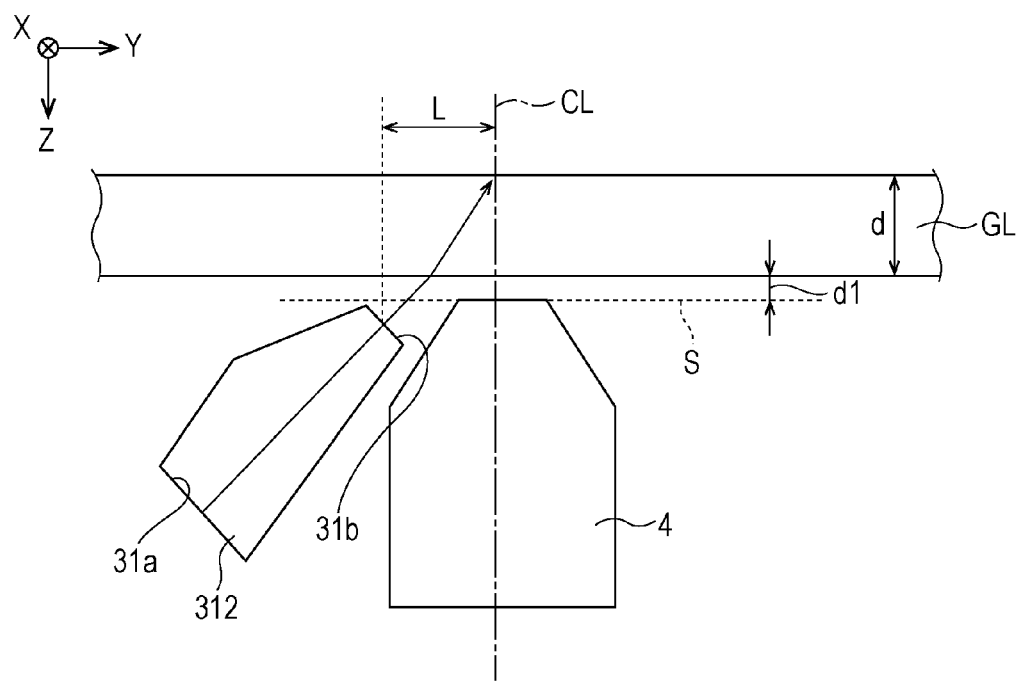
FIGS. 12A and 12B are diagrams illustrating an illumination state of a document according to Modification Example 3 of the light guide.
Figure 12B:
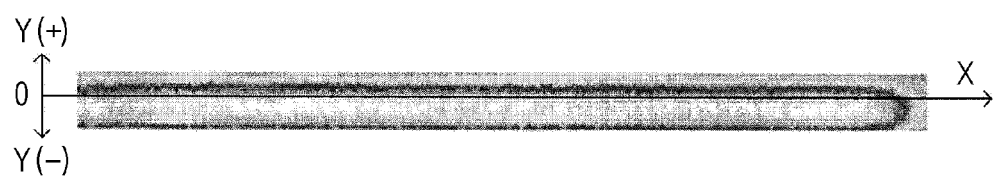

Hereinafter, Modification Example 3 of the light guide will be described with reference to FIGS. 12A and 12B. FIGS. 12A and 12B are diagrams illustrating an illumination state of a document in Modification Example 3 of the light guide. FIG. 12A illustrates an arrangement relationship between the light guide and a lens unit, and FIG. 12B illustrates an illumination state of the document. The example illustrated in FIG. 12A is different from the example illustrated in FIG. 8A in that a cross section perpendicular to the longitudinal direction of a light guide 312 is formed to have a pentagonal shape that tapers toward the light emitting surface 31b side from the reflecting surface 31a side. Other components are the same as the above-described example, and thus a description thereof will not be repeated by providing the same reference numerals.

In Modification Example 3 illustrated in FIG. 12A, as illustrated in FIG. 12B, the portion where the upper surface of the document glass GL and the optical axis CL of the lens unit 4 intersect is appropriately irradiated with light use efficiency of 19.9% with the light emitted from the light emitting surface 31b of the light guide 312 in the form of a band.

Modification Example 4

Figure 13A:
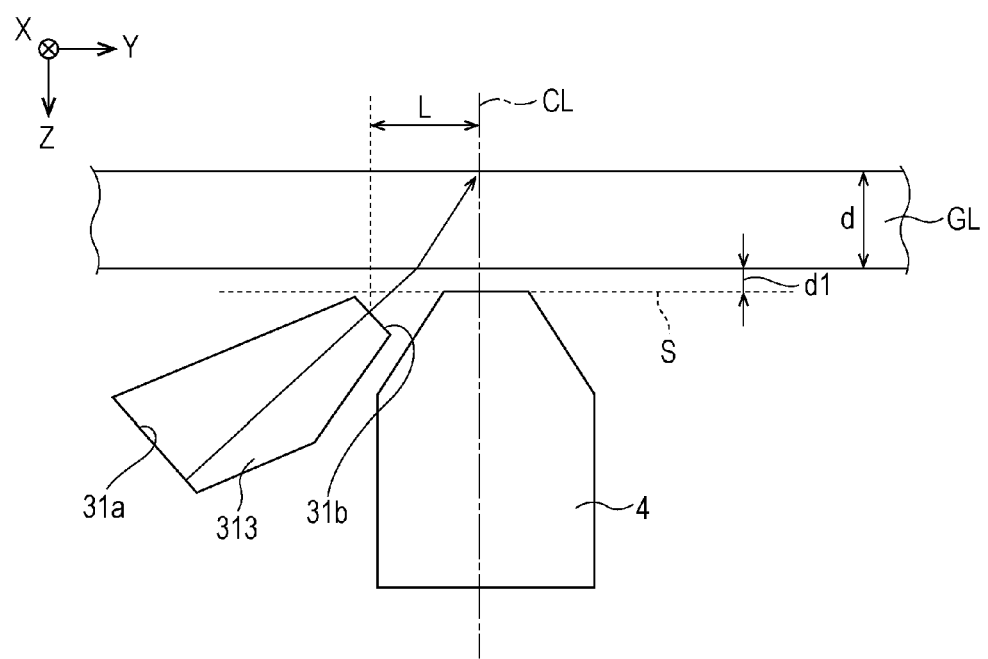
FIGS. 13A and 13B are diagrams illustrating an illumination state of a document according to Modification Example 4 of the light guide.
Figure 13B:
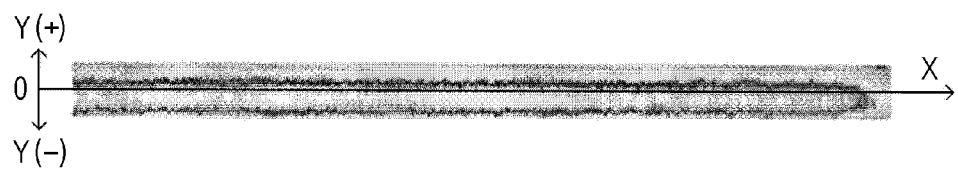

Hereinafter, Modification Example 4 of the light guide will be described with reference to FIGS. 13A and 13B. FIGS. 13A and 13B are diagrams illustrating an illumination state of a document in Modification Example 4 of the light guide. FIG. 13A illustrates an arrangement relationship between the light guide and a lens unit, and FIG. 13B illustrates the illumination state of the document. The example illustrated in FIG. 13A is different from the example illustrated in FIG. 8A in that a cross section perpendicular to the longitudinal direction of a light guide 313 is formed to have a pentagonal shape that tapers toward the light emitting surface 31b side from the reflecting surface 31a side. Other components are the same as the above-described example, and thus a description thereof will not be repeated by providing the same reference numerals.

In Modification Example 4 illustrated in FIG. 13A, as illustrated in FIG. 13B, the portion where the upper surface of the document glass GL and the optical axis CL of the lens unit 4 intersect is appropriately irradiated with light use efficiency of 21.2% with the light emitted from the light emitting surface 31b of the light guide 313 in the form of a band.

Modification Example 5

Figure 14A:
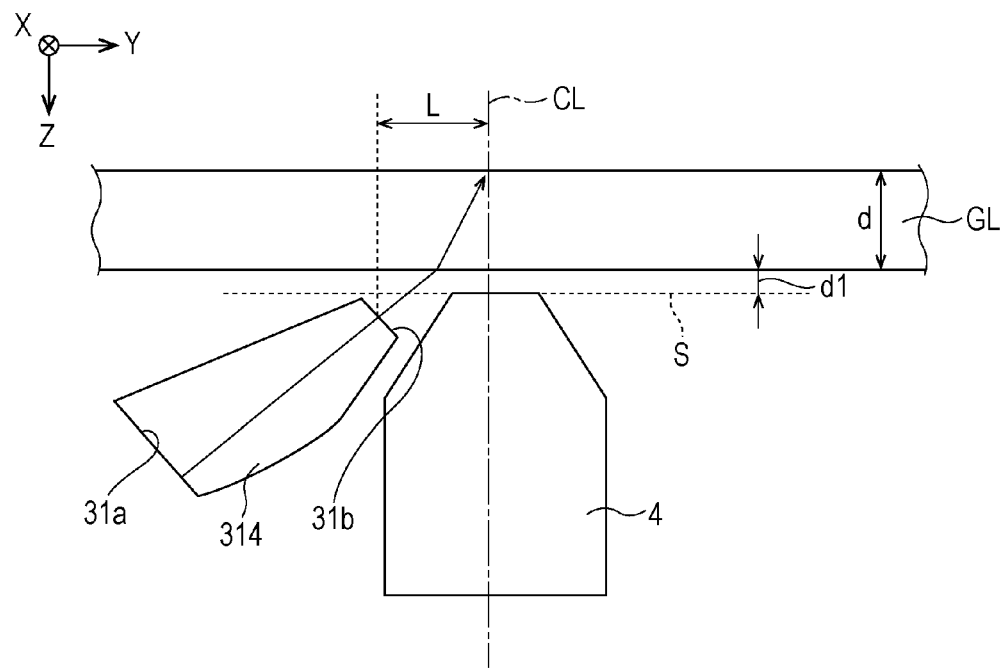
FIGS. 14A and 14B are diagrams illustrating an illumination state of a document according to Modification Example 5 of the light guide.
Figure 14B:
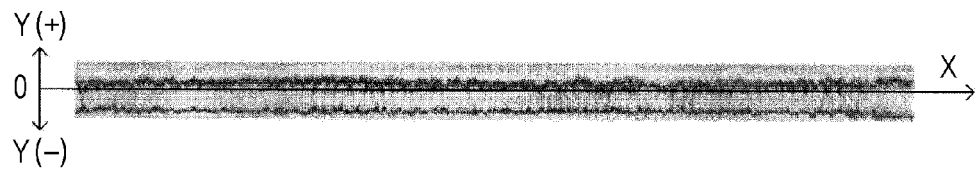

Hereinafter, Modification Example 5 of the light guide will be described with reference to FIGS. 14A and 14B. FIGS. 14A and 14B are diagrams illustrating an illumination state of a document in Modification Example 5 of the light guide. FIG. 14A illustrates an arrangement relationship between the light guide and a lens unit, and FIG. 14B illustrates the illumination state of the document. The example illustrated in FIG. 14A is different from the example illustrated in FIG. 13A in that although a cross section perpendicular to the longitudinal direction of a light guide 314 is formed to have a pentagonal shape that tapers toward the light emitting surface 31b side from the reflecting surface 31a side, a part of the outer circumferential surface is formed as a curved surface. Other components are the same as the above-described example, and thus a description thereof will not be repeated by providing the same reference numerals.

In Modification Example 5 illustrated in FIG. 14A, as illustrated in FIG. 14B, the portion where the upper surface of the document glass GL and the optical axis CL of the lens unit 4 intersect is appropriately irradiated with light use efficiency of 19.5% with the light emitted from the light emitting surface 31b of the light guide 314 in the form of a band.

Modification Example 6

Figure 15A:
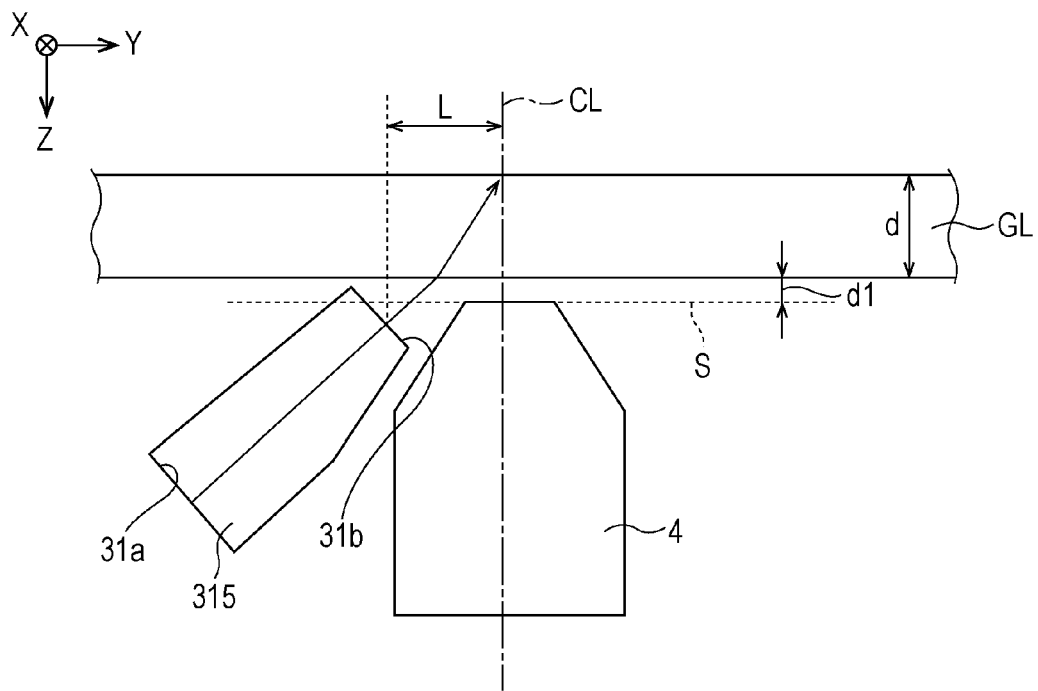
FIGS. 15A and 15B are diagrams illustrating an illumination state of a document according to Modification Example 6 of the light guide.
Figure 15B:
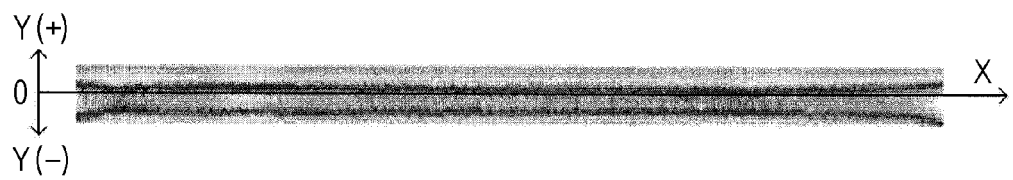

Hereinafter, Modification Example 6 of the light guide will be described with reference to FIGS. 15A and 15B. FIGS. 15A and 15B are diagrams illustrating an illumination state of a document in Modification Example 6 of the light guide. FIG. 15A illustrates an arrangement relationship between the light guide and a lens unit, and FIG. 15B illustrates the illumination state of the document. The example illustrated in FIG. 15A is different from the example illustrated in FIG. 8A in that a light guide 315 is formed by chamfering a portion of an outer circumferential surface of a rod-shaped transparent member having a rectangular cross section, perpendicular to the longitudinal direction thereof, which faces the lens unit 4 along the light emitting surface 31b in the longitudinal direction, and thus the cross section thereof is formed to have a shape that tapers toward the light emitting surface 31b side from the reflecting surface 31a side. In addition, the chamfered portion of the outer circumferential surface of the light guide 315 and the chamfered portion of the lens unit 4 are disposed so as to face each other, and thus the light guide 315 and the lens unit 4 are disposed close to each other. Other components are the same as the above-described example, and thus a description thereof will not be repeated by providing the same reference numerals.

In Modification Example 6 illustrated in FIG. 15A, as illustrated in FIG. 15B, the portion where the upper surface of the document glass GL and the optical axis CL of the lens unit 4 intersect is appropriately irradiated with light use efficiency of 21% with the light emitted from the light emitting surface 31b of the light guide 315 in the form of a band. Meanwhile, as illustrated in FIG. 15A, when the light guide 315 and the lens unit 4 are disposed close to each other, if an upper corner of corners adjacent to the light emitting surface 31b of the light guide 315 protrudes to a large extent toward the document glass GL side beyond a plane S, the upper corner of the light emitting surface 31b may also likely to be chamfered.

Method of Molding Frame

Figure 16:
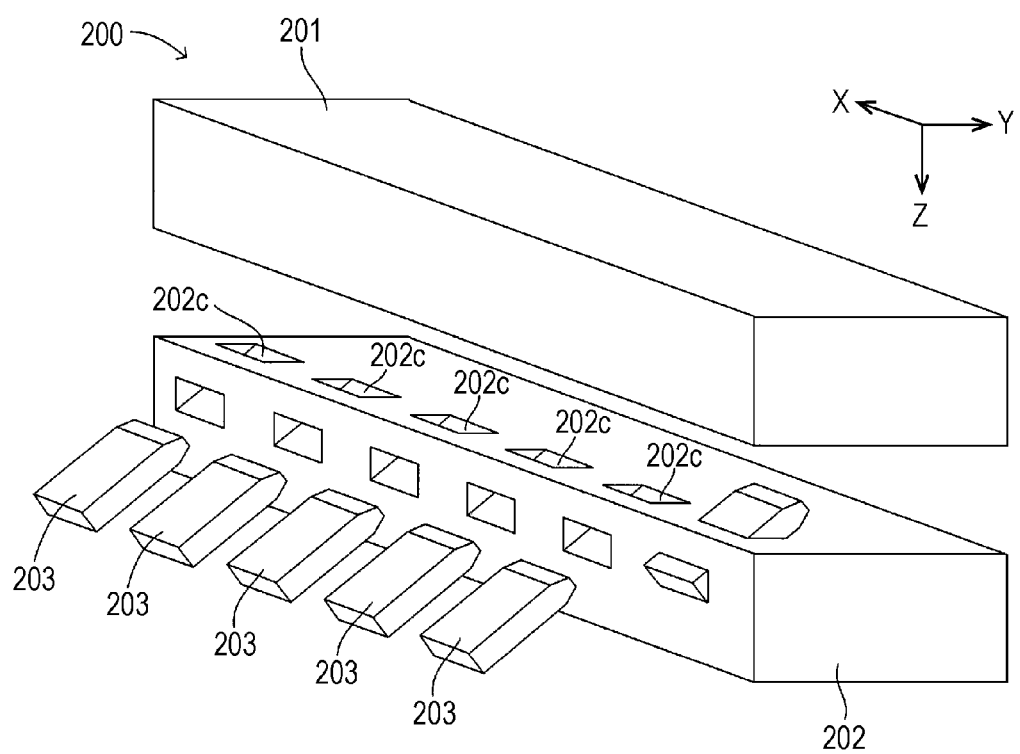
FIG. 16 is a perspective view illustrating a mold for molding a frame.
Figure 17:
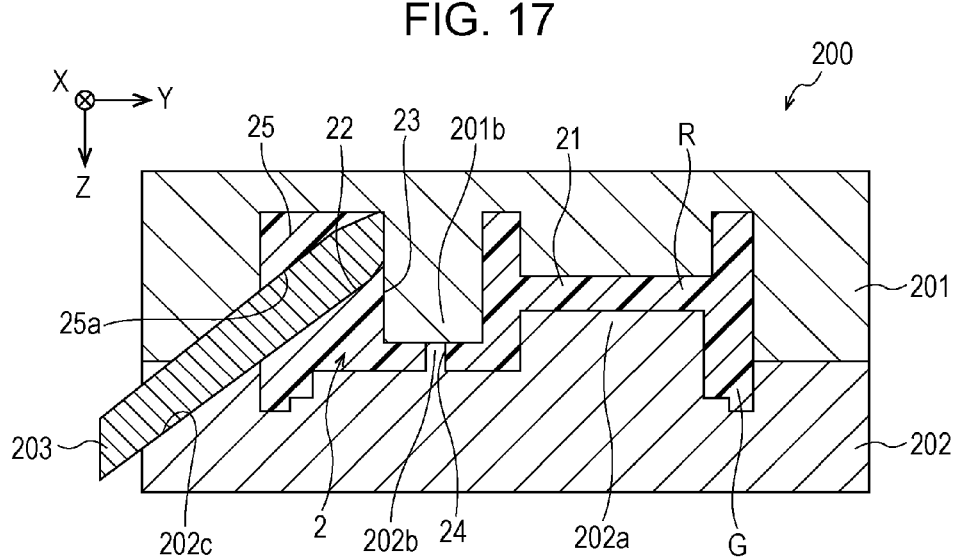
FIG. 17 is a cross-sectional view of the mold at a position corresponding to the cross section of the frame illustrated in FIG. 2.
Figure 18:
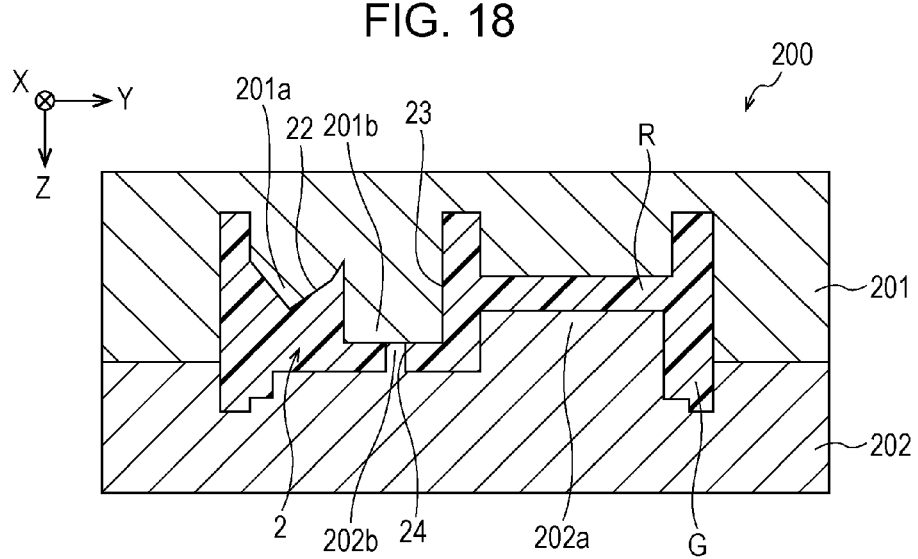
FIG. 18 is a cross-sectional view of the mold at a position corresponding to the cross section of the frame illustrated in FIG. 3.

Hereinafter, an example of a method of molding a frame will be described with reference to FIG. 2, FIG. 3, and FIGS. 16 to 18. FIG. 16 is a perspective view illustrating a mold for molding the frame. FIG. 17 is a cross-sectional view of the mold at a position corresponding to the cross section of the frame illustrated in FIG. 2. FIG. 18 is a cross sectional view of the mold at a position corresponding to the cross section of the frame illustrated in FIG. 3. A mold 200 for molding the frame 2 includes an upper mold 201, a lower mold 202, and pressing member forming dies 203. In addition, a die 201a for forming the inclined groove 22 on the upper surface side of the intermediate member 21 and a die 201b for forming the concave groove 23 are provided in a lower surface of the upper mold 201. Further, a die 202a for forming a lower surface shape of the intermediate member 21 and a die 202b for forming the slit 24 are provided in an upper surface of the lower mold 202. In addition, a plurality of inclined holes 202c communicating with the upper surface from the side surface on the left side toward the paper plane are provided along the longitudinal direction in the lower mold 202. The pressing member forming dies 203 are inserted into the respective inclined holes 202c so that tips of the pressing member forming dies 203 protrude from the lateral side of the lower mold 202 to the upper surface side thereof. Meanwhile, the upper surface of the tip of each pressing member forming die 203 which protrudes from the surface of the lower mold 202 is formed to have substantially the same shape as the upper circumferential surface of the light guide 31 that is inserted into the inclined groove 22 of the frame 2. The tip side of each pressing member forming die 203 for forming the pressing member 25 (inclined groove 22) may be appropriately formed to have a shape according to the shape of the light guide (light guide body) inserted into the inclined groove 22.

In a state where each pressing member forming die 203 is inserted into each inclined hole 202c of the lower mold 202, the upper mold 201 and the lower mold 202 engage with each other by closely adhering a lower surface of the upper mold 201 to an upper surface of the lower mold 202, and thus a gap G in which a liquid R such as a resin for forming the frame 2 is filled is formed between the lower surface of the upper mold 201 and the upper surface of the lower mold 202. Meanwhile, the die 201a for forming the inclined groove 22 provided in the lower surface of the upper mold 201 is formed so as to be tightly stuck between the pressing member forming dies 203 protruding on the upper surface side of the lower mold 202 in a state where the upper mold 201 and the lower mold 202 are combined together. In other words, the die 201a of the upper mold 201 and the pressing member forming dies 203 are alternately arranged in the longitudinal direction (X direction) so as to closely adhere to each other, and thus a mold for forming the inclined groove 22 of the frame 2 is formed by the closely-adhered die 201a and the lower surfaces of the pressing member forming dies 203, and a mold for forming the pressing members 25 is formed by the upper surfaces of the pressing member forming dies 203.

The upper mold 201, the lower mold 202, and the pressing member forming dies 203 that are configured in this manner are combined together, and thus the liquid R such as a melt resin is poured into the gap G formed between the lower surface of the upper mold 201 and the upper surface of the lower mold 202, and the liquid R such as a resin is hardened. Then, after the pressing member forming dies 203 are pulled out, the upper mold 201 and the lower mold 202 are removed, thereby completing the frame 2.

As described above, in the above-described embodiment, the rod-shaped light guides 31, 310a, 310b, 311, 312, 313, 314, and 315 (hereinafter, referred to as "light guide bodies") that guide the light of the LED to the document OB are formed of a transparent member. In addition, the light guide body includes the reflecting surface 31a in which a reflection structure reflecting the light of the LED, which is incident into the light guide body from at least one end surface of the light guide body, is formed, and the light emitting surface 31b from which the light reflected by the reflecting surface 31a is emitted toward the document OB. The reflecting surface 31a and the light emitting surface 31b are formed along the longitudinal direction (X direction) in the outer circumferential surface of the light guide body and are disposed so as to face each other with the transparent member interposed therebetween. Since the light emitting surface 31b in the cross section perpendicular to the longitudinal direction of the light guide body is formed to have a width smaller than that of the reflecting surface 31a, the light of the LED which is incident from the end surface of the light guide body and is scattered throughout the entirety of the longitudinal direction in the reflecting surface 31a is totally reflected inside the transparent member by the outer circumferential surface of the light guide body, is condensed toward the light emitting surface 31b, and is emitted in the form of a band toward the document OB from the light emitting surface 31b.

Therefore, since the light condensed toward the light emitting surface 31b inside the light guide body is emitted in the form of a band toward the document OB from the light emitting surface 31b, it is possible to provide the CIS module 1 including the illumination unit 3 having a new configuration capable of illuminating the portion where the document OB and the optical axis CL of the lens array included in the lens unit 4 intersect, in the form of a band with high efficiency using the illumination unit 3.

In addition, since the cross section perpendicular to the longitudinal direction of the light guide body has a shape that tapers toward the light emitting surface 31b side from the reflecting surface 31a side, it is possible to condense the light of the LED which is scattered throughout the entirety of the longitudinal direction in the reflecting surface 31a toward the light emitting surface 31b with higher efficiency by totally reflecting the light by the outer circumferential surface of the light guide body. Therefore, it is possible to illuminate the document OB with light emitted toward the document OB from the light emitting surface 31b in the form of a band with higher efficiency. In addition, since the cross section perpendicular to the longitudinal direction of the light guide body has a shape that tapers toward the light emitting surface 31b side from the reflecting surface 31a side, it is possible to dispose the center of the light emitting surface 31b in the cross section perpendicular to the longitudinal direction (X direction) thereof so as to be closer to the optical axis CL of the lens array in the cross section perpendicular to the arrangement direction (X direction) of each lens surface.

In addition, since the portion of the light guide body which faces the lens unit 4 is chamfered along the light emitting surface 31b in the longitudinal direction, the center of the light emitting surface 31b in the cross section perpendicular to the longitudinal direction is disposed so as to be closer to the optical axis CL of the lens unit 4 in the cross section perpendicular to the arrangement direction of each lens surface, thereby allowing the position (document OB) closer to the top surface in which the plurality of through holes of the lens unit 4 on the optical axis CL are formed to be illuminated using the illumination unit 3 in the form of a band. In addition, the light emitting surface 31b of the light guide body and the incidence surface of the lens unit 4 are disposed close to each other, thereby allowing the CIS module to be made small.

In addition, since the portion of the case body 41, accommodating the lens array, which faces the light guide body is chamfered in the arrangement direction of the lens surface, it is possible to dispose the center of the light emitting surface 31b in the cross section perpendicular to the longitudinal direction of the light guide body so as to be closer to the optical axis CL of the lens unit 4 in the cross section perpendicular to the arrangement direction of each lens surface.

In addition, it is possible to condense the light reflected by the reflecting surface 31a inside the transparent member forming the light guide body toward the light emitting surface 31b with higher efficiency by totally reflecting the light by the scattering surface of the light shielding film 33 with higher efficiency. Further, it is possible to prevent the light of the LED which is incident on the light guide body from leaking to the outside from the outer circumferential surface of the light guide body using the light shielding film 33. In addition, in the related art, the light guide body is accommodated in a case and is provided in the frame 2 in order to prevent the leakage of the light, but as described above, the light guide body is covered by the light shielding film 33 that is extremely thinner than the case so as to prevent the leakage of the light, and thus the light guide body and the lens unit 4 can be disposed so as to be closer to each other.

In addition, in this embodiment, the pressing member forming dies 203 are inserted into the mold 200 in which the upper mold 201 and the lower mold 202 are combined together from the side above the position corresponding to the intermediate member 21, and thus the pressing members 25 disposed above the inclined groove 22 of the frame 2 are formed. Therefore, when the frame 2 is formed, there is no concern that a hole (bore) via which the upper space and the lower space communicate with each other is formed in the intermediate member 21, aside from the slit 24 through which the light emitted from the lens unit 4 in order to form the erect equal-magnification image on the sensor 5. Accordingly, it is possible to prevent the light of the illumination unit 3 from leaking to the sensor 5 by causing the illumination unit 3 disposed in the upper space to be reliably spaced apart from the sensor 5 (printed circuit substrate 6) disposed in the lower space. Therefore, since the light of the illumination unit 3 can be reliably prevented from leaking to the sensor 5, the light shielding film 33 covering the light guide body can be omitted.

Meanwhile, the invention is not limited to the above-described embodiment, and various modifications thereof can be made without departing from the scope of the invention. For example, the manner of the chamfering performed on the light guide body or the lens unit 4 is not limited to the above-described example. The chamfering may be performed on the light guide body or the lens unit 4 so that the optical axis CL of the lens unit 4 is appropriately irradiated with the light emitted from the light emitting surface 31b of the light guide body by disposing the light guide body and the lens unit 4 so as to be disposed close to each other.

In addition, as long as the erect equal-magnification image can be appropriately formed on the sensor 5, the lens unit 4 (image forming optical device) may be configured in any way, and it is possible to employ a lens array in which a row of lenses is arranged, a lens array in which a plurality of rows of lenses are arranged, or the like. Further, it is possible to employ an image forming optical device in which aperture members are respectively disposed on the incidence side and the emission side of a lens array, an image forming optical device in which a plurality of lens arrays are arranged in an optical axis direction and aperture members are respectively disposed on the incidence side, between the lens arrays, and on the emission side, or the like. In addition, an image forming optical device may be configured by an SLA (SELFOC (registered trademark) lens array).

In addition, in the above-described embodiment, although the pressing member 25 is integrally molded in the frame 2 using the pressing member forming dies 203, the pressing member 25 may be formed in the frame 2 by protrusively disposing dies each having the same tip surface shape as the lower surface of the pressing member 25 on the upper surface of the lower mold 202 instead of the pressing member forming dies 203.

The invention can be widely applied to an image reading device including an image forming optical device that forms an erect equal-magnification image by forming an image of reflected light from an object to be read.

What is claimed is:

1. An image reading device comprising:
   an illumination unit that has a light guide body guiding light of a light source to an object to be read and illuminates the object; and
   an image forming optical device that is disposed parallel to the light guide body, has a lens array provided with an incidence surface in which a plurality of lens surfaces are arranged in the same direction as a longitudinal direction of the light guide body, and condenses reflected light from the object which is incident on the incidence surface, thereby forming an erect equal-magnification image on a sensor,
   wherein the light guide body is formed of a transparent member, and includes a reflecting surface in which a reflection structure reflecting the light of the light source, which is incident into the light guide body, is formed, and a light emitting surface from which the light reflected by the reflecting surface is emitted toward the object,
   wherein the light guide body tapers in the longitudinal direction toward the light emitting surface to reduce the size of the light emitting surface,
   wherein the lens array tapers toward the incident surface to reduce the size of the incident surface, and
   wherein the illumination unit contacts the image forming optical device in an area where a tapered portion of the light guide body faces a tapered portion of the lens array.

2. The image reading device according to claim 1, wherein a portion of the light guide body which faces the image forming optical device is chamfered along the light emitting surface in the longitudinal direction in the outer circumferential surface thereof, and the light emitting surface of the light guide body and the incidence surface of the image forming optical device are disposed close to each other.

3. The image reading device according to claim 1, wherein the image forming optical device further includes a case body that accommodates the lens array, and a portion of the case body which faces the light guide body is chamfered along an arrangement direction of the lens surface.

4. The image reading device according to claim 1, wherein the illumination unit further includes a light shielding film that covers the outer circumferential surface of the light guide body except for the light emitting surface, and a scattering surface that scatters light is formed on a surface of the light shielding film which comes into contact with the transparent member.

\* \* \* \* \*